2,842,503

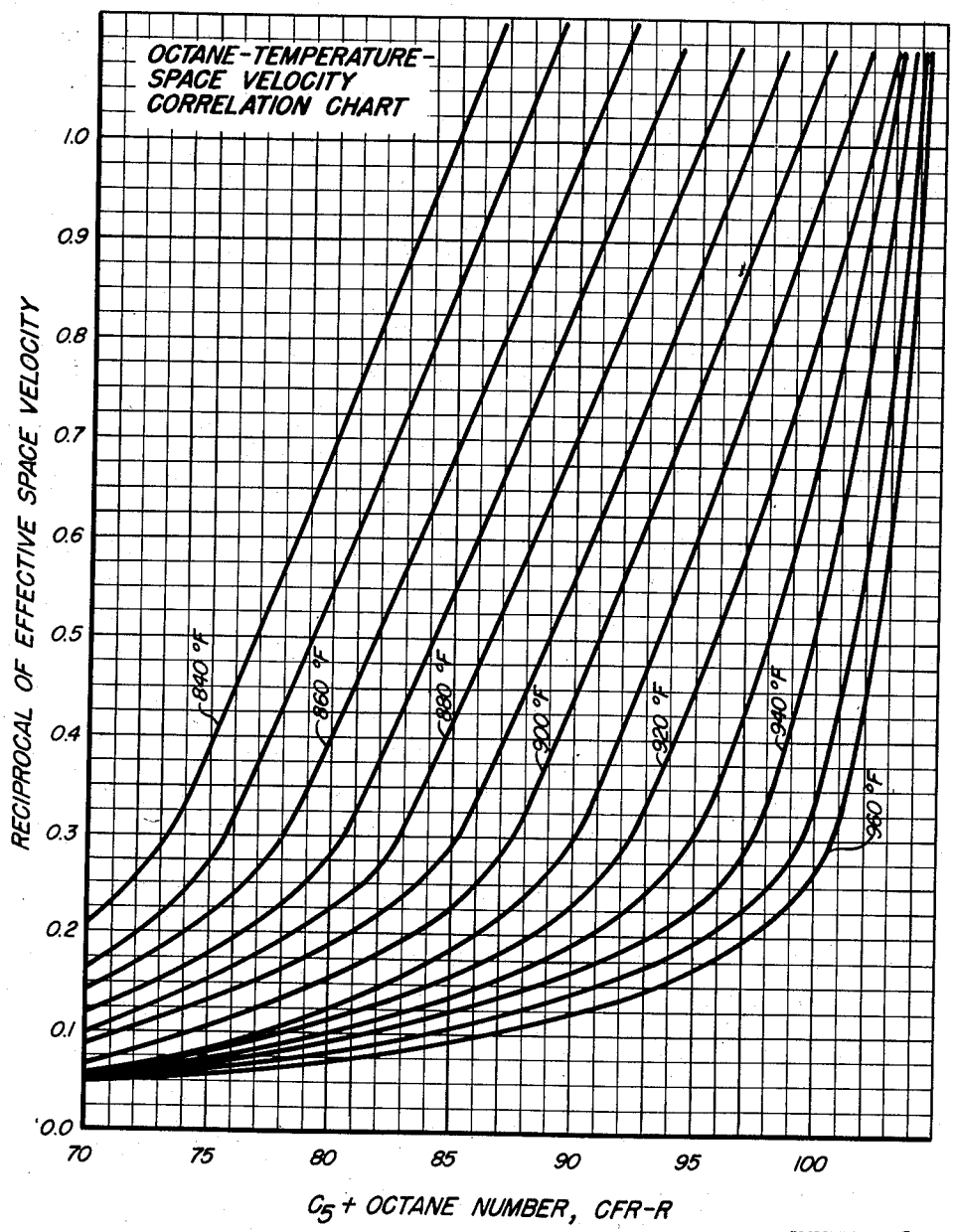

REACTIVATION OF PLATINUM-ALUMINA CATALYSTS

Edmond L. D'Ouville, La Grange, and Robert C. Arnold, Park Forest, Ill., assignors to Standard Oil Company, Chicago, Ill., a corporation of Indiana Application March 23, 1955, Serial No. 496,239

9 Claims. (Cl. 252—412)

Our invention relates to the hydroforming of hydrocarbons. More particularly, it relates to the restoration of the activity of platinum-alumina catalysts which have lost a part of their reforming power during use in a naphtha hydroforming process.

The use of alumina-supported platinum catalysts in the hydroforming of naphthas to produce gasolines of high antiknock rating is now being practiced commercially on a large scale. The success of such catalysts, despite their high cost, lies in the fact that they are capable of operating for long periods of time with carefully chosen charging stocks and process conditions. They are nevertheless highly sensitive to certain poisons, and in the course of time they eventually decrease in activity, so that they must either be replaced or must be subjected to some form of reactivation. We have now discovered a simple technique whereby a platinum-alumina catalyst can successfully be restored in large part to its original activity after deactivation in the hydroforming of naphthas. It is accordingly an object of our invention to revivify such catalysts and thereby to effect an improvement in the platinum hydroforming of hydrocarbons.

In our new process, a deactivated catalyst of the platinum-alumina type is impregnated with a solution of aluminum chloride or other inorganic aluminum salt, adapted to wet the surfaces thereof while avoiding any depletive washing action on the platinum contained therein. The catalyst is then dried and calcined under conventional conditions, and is restored thereby to substantially its original activity.

The mechanism whereby our invention achieves its advantageous results cannot readily be explained. It is known that an aqueous solution of aluminum chloride and aluminum nitrate is an excellent solvent for platinum, and has been employed by Appell in U. S. Patent 2,635,080 (April 14, 1953) for the recovery of platinum from spent catalysts. Such a mixed-salt solution, however, is ineffective in our process. It is possible that our aluminum-salt solutions may cause a reorientation of the platinum crystallites, or a breakdown and regeneration thereof, in such a manner as to restore their catalytic activity. It will be understood, however, that this theory is advanced only as a plausible explanation of the observed results, and that we do not wish to be bound thereby.

Our invention is carried out in the following manner. A platinum-alumina hydroforming catalyst, containing between about 0.01 and 1 percent by weight of platinum, based on dry alumina, with or without a third component such as silica, fluorine, or the like, is employed in a conventional hydroforming operation until it becomes at least partially spent. The hydroforming operation is then discontinued, and the catalyst is purged and treated under oxidizing conditions to remove carbonaceous deposits therefrom. The essentially carbon-free catalyst is treated at ordinary or slightly elevated temperatures with a small amount of inorganic aluminum salt dissolved in a suitable solvent. Excess solution may be removed from the catalyst if desired by draining and/or washing with a limited quantity of fresh solvent (e. g., 25 to 50 percent by weight thereof). The catalyst is thereafter dried for 1 to 24 hours at 200 to 400° F., calcined for 1 to 12 hours at 800 to 1200° F., and again employed as catalyst in a naphtha hydroforming operation. Catalysts characterized by low activity and short effective life, when treated in the above manner, are restored to a quality approximating that of fresh catalysts.

Suitable oxidation treatments to remove carbonaceous deposits from the spent catalyst include conventional regeneration with air or dilute air mixtures at temperatures between about 800 to 1300° F. and the so-called regeneration-rejuvenation treatments wherein the catalyst is subjected successively to a carbon burn-off step and an oxygen soak at high temperature and oxygen partial pressure. Such an oxygen soak can suitably be carried out at an oxygen partial pressure above about 0.4 atmosphere, preferably between about 0.4 and 4 atmospheres, and a temperature between about 825 and 1300° F., preferably between about 1000 and 1200° F. We ordinarily prefer to use the combined regeneration-rejuvenation treatment prior to treatment with aluminum salt solution according to our invention. Optionally, the carbon-depleted catalyst may be reduced with hydrogen at elevated temperatures within or around the hydroforming range (i. e., between about 850 and 1000° F.) prior to treatment with aluminum salt solution.

The reactivating agent employed in our invention is a solution of an inorganic aluminum salt, having substantially no solvency for platinum in deactivated platinum-alumina catalysts—i. e., a salt solution which dissolves less than about 1 percent of the platinum contained in a conventional 0.6 percent platinum-on-alumina catalyst on prolonged contact in 2:1 volume ratio with said catalyst at ordinary temperatures. Suitable aluminum salts include the nitrate, the sulfate, and other inorganic aluminum salts which can be dissolved without decomposition and without metathetical reaction with the solvent. We prefer to use the soluble halides, such as the bromide or iodide, or optimally the chloride. A hydrate of the chosen salt may be used where the water of hydration does not cause undesirable side reactions or render the salt insoluble in the chosen solvent. We prefer to use water as the solvent, and to use salts which can be dissolved therein without separation of hydrous alumina. Other suitable solvents include hydrocarbons such as benzene, toluene, xylenes, cyclohexane, methylcyclohexane, n-butane, isobutane, n-octane, isooctane, and petroleum naphthas, halogenated hydrocarbons such as chloroform, carbon tetrachloride, and ethylene dibromide, ethers such as diethyl ether and dibutyl ether, alcohols such as methanol, ethanol, and isopropyl alcohol, ketones such as acetone and methyl ethyl ketone, and the like. Mixtures of the foregoing solvents can be employed, if desired, especially in connection with relatively insoluble salts, and the solutions may also include wetting agents such as sodium benzenesulfonate, a polyethylene glycol, a glycol ether, or the like. The concentration of added solvents or wetting agents may range up to the saturation point or to the point of incompatibility.

Our process is capable of producing some degree of reactivation of spent platinum-alumina catalysts even when very small quantities of aluminum salt are added to the catalyst. It is desirable, however, to employ the aluminum salt in a molar ratio to the alumina of at least about 0.001:1, anhydrous basis, and we find that the incremental reactivating effect of the aluminum salt falls off rapidly at molar ratios above about 0.02:1. In a preferred form of our invention, we employ aluminum chloride in the range of about 0.1 to 3 percent by weight of $AlCl_3$, based on dry $Al_2O_3$, and we have obtained best results in terms of catalyst reactivation and aluminum salt utilization at proportions between about 0.2 and 2 percent by weight of $AlCl_3$.

The concentration of aluminum salt in our reactivating solution may suitably range upward from about 0.01 M, the exact concentration employed being determined by the quantity of aluminum salt and the volume of solution to be added to the catalyst. In a preferred embodiment of our invention, we employ only a sufficient quantity of the aluminum salt solution to saturate the catalyst particles and to wet the surfaces of the catalyst. For this purpose, between about 75 and 80 grams of solution per 100 grams of catalyst particles are ordinarily sufficient, and salt concentrations between about 0.01 M and 0.3 M are conveniently employed.

The treatment of catalysts with an aluminum salt solution according to our invention is best carried out at elevated temperatures, preferably between about 150 and 220° F., but the advantageous results of our process can be achieved at least in part at ordinary temperatures and at substantially higher temperatures. The duration of exposure of the catalyst to the salt solution prior to drying and calcination may range up to 48 hours or more. We prefer to soak the catalyst in the aluminum salt solution at the reflux temperature of the solvent for 0.25 to 6 hours, optimally around 1 hour.

Our invention can be successfully employed for the reactivation of the broad class of alumina-supported platinum hydroforming catalysts described in the art, as exemplified by Haensel U. S. Patent 2,479,109 (August 16, 1949). Such catalysts ordinarily contain between about 0.01 and 1 percent by weight of platinum, based on dry alumina, and may optionally contain added components such as fluorine, chlorine, silica, and the like. They are commonly prepared by impregnating alumina with an aqueous menstruum containing one of the various compounds of platinum, such as chloroplatinic acid, platinum sulfide, complexes of platinum with ammonia or ammonium polysulfide, and the like, and are ordinarily used in the form of pills, pellets, powders, and the like.

In designating the activity of a platinum-alumina hydroforming catalyst, it is convenient to employ a relative activity scale, by means of which the catalyst is compared to a standard catalyst operating under certain fixed conditions. For our standard, we have chosen a catalyst composed of pure Heard-type alumina, containing 0.6 percent by weight of platinum uniformly distributed throughout $\frac{1}{8}''$ x $\frac{1}{8}''$ cylindrical pills, and the evaluation thereof is carried out at 200 pounds per square inch gage with a once-through hydrogen rate of 5,000 cubic feet per barrel in the hydroforming of a Mid-Continent virgin naphtha having an ASTM boiling range of 200 to 360° F., a CFR–R octane number of 44, a sulfur content (lamp) of 0.03 percent, an API gravity of 56.5, a bromine number of 1.4, a Reid vapor pressure of 1.8 pounds per square inch, and a content of 40 percent naphthenes, 52 percent paraffins, and 8 percent aromatics. When the standard catalyst is employed under the foregoing conditions to hydroform the designated charging stock, its activity at any given temperature and space velocity, as measured by the CFR–R octane number of the $C_5+$ product fraction, is arbitrarily assigned the value of 100.

In setting up the standard of activity, the standard catalyst was first subjected to a series of hydroforming tests over a range of catalyst temperatures and space velocities in a quasi-isothermal laboratory reactor comprising a tubular reaction vessel holding 50 milliliters of catalyst, surrounded by an electrically heated metal black for temperature control, and the CFR–R octane number of the $C_5+$ product fraction from each set of conditions was determined. Since the hydroforming reactions are predominantly endothermic in nature, the catalyst exit temperature is always lower than the catalyst inlet temperature, but the extent of the difference is variable, depending upon the space velocity, the activity of the catalyst (in the case of catalysts other than the standard), and other factors. This variability, we found, could be eliminated by correcting the observed $C_5+$ product fraction octane numbers, the correction being made by subtracting 0.075 octane number per ° F. of temperature difference. The corrected octane numbers were then plotted against the reciprocal of the space velocity as a family of curves with the catalyst exit temperature as the parameter, giving the attached reference graph for use in computing the relative activity of other catalysts.

In measuring the relative activity of a catalyst, it is subjected to a hydroforming test under conditions approximating the standard conditions set forth above. During the test, the average catalyst inlet temperatures, the average catalyst exit temperature, and the average space velocity are observed, and the reaction product is collected for determination of the CFR–R octane number of the $C_5+$ fraction thereof. The said product fraction octane number is corrected as described above for the catalyst temperature gradient, and the corrected octane number is then employed in conjunction with the appended reference curves to determine the reciprocal of the equivalent liquid volume space velocity which would be required by the standard catalyst at the same catalyst exit temperature to produce the same product quality. The corresponding space velocity may be termed the "effective liquid volume space velocity" of the catalyst under test, as contrasted with the actual space velocity. Finally, the said reciprocal of the effective liquid volume space velocity is multiplied by the actual liquid volume space velocity (volume of charging stock per volume of catalyst per hour) used in the test, and the quotient is multiplied by 100. The result is the measured activity of the catalyst, relative to the standard catalyst. The said measured activity is the number of volumes of standard catalyst that would be required to accomplish the same result as 100 volumes of the catalyst under test.

Our invention will be more fully understood from the following specific examples.

*Example 1*

An alumina hydrosol was prepared according to the technique of Heard, described in Reissue Patent 22,196 (October 6, 1942), by amalgamating a quantity of 99.99 percent aluminum metal and reacting the amalgamated aluminum with hot aqueous 2 percent acetic acid. A platinum solution was prepared by commingling ammonium polysulfide with aqueous chloroplatinic acid solution. A sufficient quantity of the platinum solution was commingled with the alumina hydrosol to incorporate 0.6 percent by weight of platinum therein, based on dry $Al_2O_3$. The resulting mixture was dried, calcined, crushed, lubricated with 4 percent of Sterotex, formed into $\frac{1}{8}$-inch pellets, and recalcined at 1100° F.

The completed catalyst was employed in the treatment of a Mid-Continent virgin naphtha in a cyclic hydroforming operation, involving successive on-stream and oxidative regeneration periods, until the activity of the catalyst had become seriously impaired. The spent catalyst was then withdrawn from the reactor.

An aliquot of the spent catalyst was burned substantially free from carbon in air, and was then subjected to an activity test. A quasi-isothermal laboratory reactor was employed for the test, comprising a tubular reaction vessel holding 50 milliliters of catalyst, surrounded by an electrically heated metal block for temperature control. The block was maintained at a temperature of approximately 935° F., and the hydroforming reaction was carried out at a pressure of 200 pounds per square inch gage, a liquid space velocity of 2, and a once-through hydrogen rate of 5,000 cubic feet per barrel of feed. The products were collected at intervals and tested, with the results given in the table below.

Another aliquot of the spent catalyst, weighing approximately 55 grams, was burned substantially free from carbon in air, and was then saturated with 50 milliliters of an aqueous solution of aluminum chloride hexahydrate containing 0.33 gram of $AlCl_3$ (approximately 0.6 percent by weight of $AlCl_3$, based on dry $Al_2O_3$), the entire quantity of solution being absorbed by the catalyst pellets. The treated catalyst was dried and calcined at 1100° F., and was subsequently tested under the hydroforming conditions described above. The results of the two tests, given in the following table, illustrate the remarkable improvement in catalyst activity obtainable by means of our reactivation procedure.

| Product Interval | Spent Catalyst | | $AlCl_3$-Treated Catalyst | |
|---|---|---|---|---|
| | Octane No., CFR-R | Relative Activity | Octane No., CFR-R | Relative Activity |
| 0–20 hr | 90.9 | 55 | | 162 |
| 20–40 hr | 89.8 | 50 | 96.4 | 126 |
| 40–60 hr | 89.7 | 52 | 95.6 | 110 |
| 60–80 hr | 91.1 | 58 | 94.8 | 94 |

*Example 2*

A 0.6 percent platinum-on-alumina catalyst was employed in the hydroforming of a petroleum naphtha until it had dropped in activity to less than half of its initial level, and was then withdrawn from the hydroforming zone. A 100-gram portion of the spent catalyst was burned substantially free of carbon with diluted air, and was thereafter boiled overnight in 100 milliliters of a solution of 2 grams of anhydrous aluminum chloride in benzene. The benzene solution was decanted, and the catalyst was dried at 220° F., then calcined 6 hours at 1100° F.

Comparative hydroforming tests revealed that the spent catalyst had an activity of 40, while the treated catalyst had an activity of 220.

While we have described our invention with reference to certain specific embodiments thereof, it should be understood that such embodiments are illustrative only and not by way of limitation. Various modifications of our invention and alternative operating procedures and conditions will be apparent from the foregoing description to those skilled in the art.

This application is a continuation-in-part of our application Serial No. 379,428, filed September 10, 1953, now abandoned.

In accordance with the foregoing description, we claim as our invention:

1. A method for restoring the activity of an alumina-supported platinum hydroforming catalyst after deactivation thereof in the hydroforming of a hydrocarbon charging stock and after removing carbonaceous deposits therefrom, which comprises introducing into said catalyst a solution of aluminum chloride, said solution being free from added acid and having substantially no solvency for platinum, and thereafter drying and calcining.

2. A method for revivifying a spent platinum-alumina hydroforming catalyst after removing carbonaceous deposits therefrom which comprises absorbing into said catalyst a solution of aluminum chloride, said solution being free from added acid and having substantially no solvency for platinum, in a quantity containing said chloride in a molar ratio to the alumina in said catalyst above about 0.001:1, and thereafter drying and calcining.

3. A method for reactivating a spent platinum-alumina hydroforming catalyst after removing carbonaceous deposits therefrom which comprises absorbing into said catalyst a solution of aluminum chloride in a quantity containing said aluminum chloride in a molar ratio to the alumina in said catalyst between about 0.001:1 and 0.02:1, said solution being free from added acid and having substantially no solvency for platinum, and thereafter drying and calcining.

4. A method for restoring the activity of a deactivated platinum-alumina hydroforming catalyst after burning carbon therefrom which comprises impregnating said catalyst with a hydrocarbon solution of aluminum chloride, said solution being free from added acid and having substantially no solvency for platinum, and thereafter drying and calcining.

5. A method for restoring the activity of a deactivated platinum-alumina hydroforming catalyst after burning carbon therefrom which comprises impregnating said catalyst with an aqueous solution of aluminum chloride, said solution being free from added acid and having substantially no solvency for platinum, and thereafter drying and calcining.

6. A method for reactivating a spent platinum-alumina hydroforming catalyst after burning carbon therefrom which comprises impregnating said catalyst with an aqueous solution of aluminum chloride in a quantity containing aluminum chloride in a proportion between about 0.2 and 2 percent by weight of the alumina in said catalyst, anhydrous basis, said solution being free from added acid and having substantially no solvency for platinum, and thereafter drying and calcining.

7. A method for reactivating an exhausted platinum-alumina hydroforming catalyst after burning carbon therefrom which comprises treating said catalyst with a solution of aluminum chloride, said solution being free from added acid and having substantially no solvency for platinum, by adding thereto a sufficient quantity of said solution to substantially saturate said catalyst while avoiding any unabsorbed excess of said solution, and drying and calcining.

8. A method for revivifying a spent platinum-alumina hydroforming catalyst after burning carbon therefrom which comprises adding to the said catalyst an aqueous solution of aluminum chloride, said solution being free from added acid and having substantially no solvency for platinum, in the proportion of around 75 grams of solution per 100 grams of catalyst, whereby substantially the entire amount of the said solution is absorbed in the said catalyst, and thereafter drying and calcining.

9. A method for rejuvenating an exhausted platinum-alumina catalyst which comprises burning carbon therefrom, contacting the carbon-depleted catalyst with a gas stream containing oxygen at a partial pressure above about 0.4 atmosphere and at a temperature between about 825 and 1300° F., cooling the catalyst, adding thereto an aqueous solution of aluminum chloride in a limited amount such that substantially the entire quantity thereof is absorbed in the said catalyst and such that the proportion of aluminum chloride, anhydrous basis, added thereby to the catalyst is between about 0.2 and 2 percent by weight of the alumina contained therein, anhydrous basis, said solution being free from added acid, and thereafter drying and calcining.

References Cited in the file of this patent

UNITED STATES PATENTS

| 2,635,080 | Appell | Apr. 14, 1953 |
| 2,704,281 | Appell | Mar. 15, 1955 |